No. 842,522. PATENTED JAN. 29, 1907.
H. A. BYERS.
PHOTOGRAPHIC SHUTTER.
APPLICATION FILED AUG. 14, 1905.
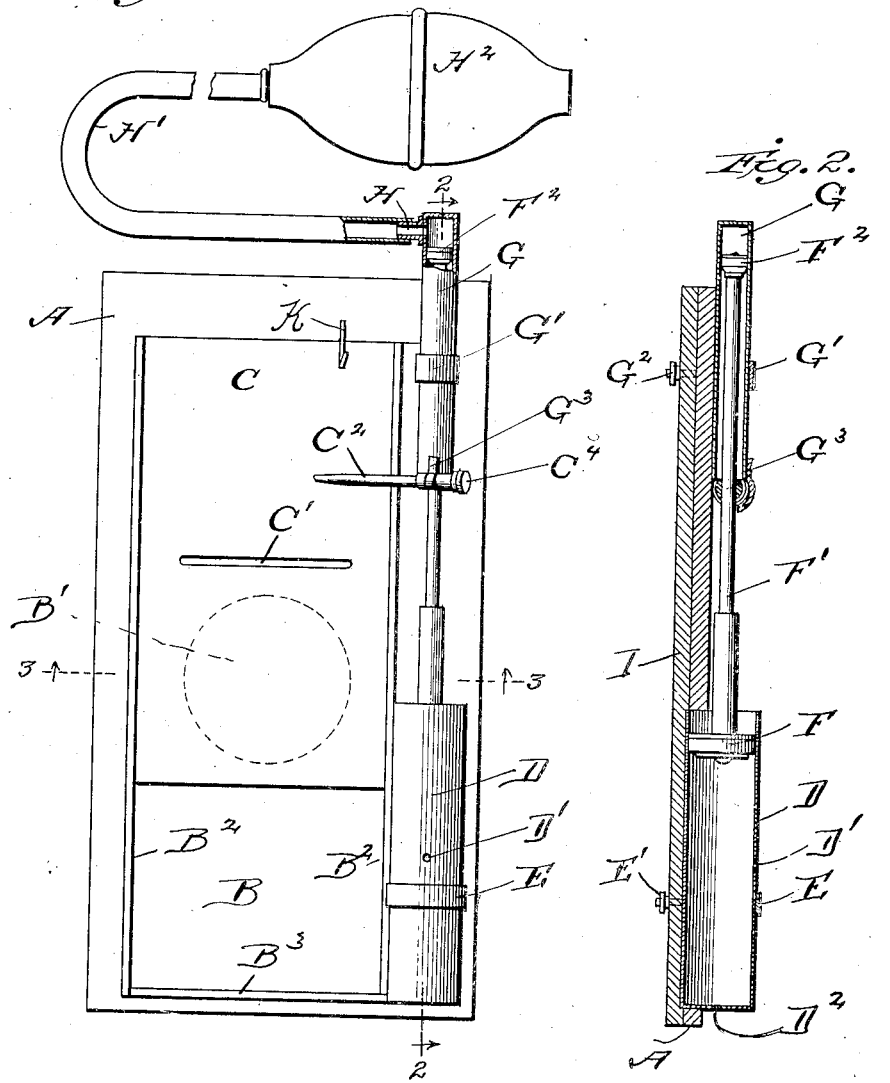
Inventor
H. A. Byers.
Witnesses
J. M. Fowler Jr.
Rea P. Wright.
By O'Meara & Brock
Attorneys

UNITED STATES PATENT OFFICE.

HENRY A. BYERS, OF PE ELL, WASHINGTON.

PHOTOGRAPHIC SHUTTER.

No. 842,522.  Specification of Letters Patent.  Patented Jan. 29, 1907.

Application filed August 14, 1905. Serial No. 274,140.

*To all whom it may concern:*

Be it known that I, HENRY A. BYERS, a citizen of the United States, residing at Pe Ell, in the county of Lewis and State of Washington, have invented a new and useful Photographic Shutter, of which the following is a specification.

My invention relates to certain new and useful improvements in shutters for cameras, and has for its object to provide a shutter that is very simple and cheap in construction and one that can be easily and quickly attached to any camera.

Another object of my invention is to provide a shutter that is especially adapted to take the clouds and scenery and one that can be swung out of the way while focusing the lens.

A further object of my invention is to provide a shutter for a camera that will vary the relative exposure of the plate so that the sky portion and foreground will be exposed to the actinic action of the rays of light different lengths of time, so that an even negative can be obtained under all conditions.

With these objects in view the invention consists of the novel features of construction, arrangement, and combination of parts hereinafter fully described, and pointed out in the claims.

In the drawings forming a part of this specification, Figure 1 is a side elevation of my shutter. Fig. 2 is a vertical section taken on the line 2 2 of Fig. 1. Fig. 3 is a sectional view taken on the line 3 3 of Fig. 1.

Referring to the drawings, A indicates the frame, provided with an opening A', on the face of which is mounted a metal plate B, having an opening B' in alinement with the opening A' of the frame. The lower end and side edges of the plate are bent back upon the plate, forming guideways B² and a stop B³ for the sliding shutter C to work up and down in, which shutter is provided with a slot C' of a length equal to the diameter of the opening B' and through which the light passes. Secured to the shutter C and extending out to one side is an arm C², having an opening C³ adjacent its end and provided with a thumb-screw C⁴, leading into said opening, for the purpose hereinafter described.

Mounted in a recess in the face of the frame to one side of the plate B, adjacent the lower edge, is secured an open-end cylinder D by the band E and tightening-nut E'. The cylinder D is provided with an opening D, in its side and an opening D² in its end, the opening D' being of greater size than the opening D², for the purpose hereinafter described.

Working in the cylinder D is a piston-head F, carried by the piston-rod F', which extends out the open end of the cylinder and through the opening C³ in the arm C² of the shutter and up into the smaller cylinder G, arranged adjacent the upper edge of the frame, and is secured in the arm by the thumb-screw C⁴ and is provided with a piston-head F² to fit the cylinder G, which is secured on the frame, like the cylinder D, by a band G' and nut G². The cylinder G is provided with an outwardly-extending tube H adjacent its end, to which a flexible tube H' is adapted to be secured, carrying a bulb H² at its end.

To the lower end of the cylinder G is secured a spring-catch G³, adapted to engage the arm C² and hold the shutter up until it has been forced out by the pneumatic pressure from the bulb against the piston-head F², which will allow the arm C² to drop, carrying the shutter C, and it will be seen that the slot C' will travel faster over the upper portion of the opening in the frame and plate, as the piston will drop faster at first until it passes the large opening D' in the cylinder, as the air will escape faster. It will then drop slowly until the air has escaped out of the small opening D² and it has reached the bottom.

To the back of the frame is secured a strip I, to which is hinged a plate J, provided with an opening J', in alinement with the opening of the frame, adapted to fit over the lens-tube of the camera, so that the shutter can be moving out of the way when focusing the camera, and is securely locked to the frame by a spring J² when desired to be used.

A stop-pin K, provided with an elongated head, is secured to the frame A above the plate B and is adapted to engage the shutter C and prevent the same from being accidentally pulled out of the guideway.

Having thus fully described my invention, what I claim as new, and desire to secure by Letters Patent, is—

1. In a device of the kind described, the combination with a frame having a plate hinged thereto, openings formed in the frame and plate, of a shutter working in guideways carried by the frame and means connected to said shutter for imparting a rapid initial movement and a slow terminal movement to the shutter, for the purpose described.

2. In a device of the kind described, the combination with a frame, provided with an opening, of a shutter provided with a slot working over said opening, and means connected to said shutter for imparting a rapid initial movement and a slow terminal movement to the shutter passing over the opening, for the purpose described.

3. In a device of the kind described, the combination with a frame provided with an opening and having a plate hinged thereto, of a shutter working in guideways, a speed-regulator attached to said shutter, and means for operating said shutter, for the purpose described.

4. In a device of the kind described, the combination with a frame having an opening formed therein, of a plate secured on said frame having an opening in alinement with the opening in the frame and provided with guideways, a shutter working in said guideways carrying an arm, a cylinder arranged on said frame, a rod connected to said arm, a piston-head secured on the end of said rod working in the cylinder, and means connected to the cylinder for operating the piston, for the purpose described.

5. In a device of the kind described, the combination with a frame provided with a hinged plate adapted to fit on the lens-tube of a camera, of a shutter working in guideways on said frame, an arm secured to said shutter, a rod secured to said arm, and means for operating said rod, for the purpose described.

6. In a device of the kind described, the combination with a frame provided with an opening, and a plate adapted to be secured over the lens-tube of the camera, hinged to the frame, of a shutter provided with a slot, working in guideways, means connected to said shutter for allowing the slot in the shutter to pass over the opening, in the frame at a rapid initial movement and a slow terminal movement, and means for operating said shutter, for the purpose described.

HENRY A. BYERS.

Witnesses:
J. G. DUNLOP,
HARLEY E. BYERS.